United States Patent [19]

Wilhelmi et al.

[11] Patent Number: 4,710,607
[45] Date of Patent: Dec. 1, 1987

[54] PLASMA BURNER WITH REPLACEABLE CONSUMABLE ELECTRODES

[75] Inventors: Herbert Wilhelmi, Aachen-Richterich; Kurt Kegel, Essen; Dieter Zollner, Schwaig/b. Nürnberg; Inge Lauterbach-Dammler, Nürnberg; Thomas Taube, Neunkirchen am Brand; Friedrich Rittman, Rückersdorf/b. Nürnberg, all of Fed. Rep. of Germany

[73] Assignee: C. Conradty Nurnberg GmbH & Co., Pegnitz, Fed. Rep. of Germany

[21] Appl. No.: 860,091

[22] Filed: May 6, 1986

[30] Foreign Application Priority Data

May 22, 1985 [EP] European Pat. Off. ........ 85106247.1

[51] Int. Cl.$^4$ ............................................. B23K 9/00
[52] U.S. Cl. .......................... 219/121 P; 219/121 PR; 219/121 PM; 219/119; 373/18; 373/22; 373/24
[58] Field of Search ...... 219/121 P, 121 PR, 121 PN, 219/121 PM, 121 PA, 121 PB, 119; 373/2, 18, 21, 22, 24

[56] References Cited

U.S. PATENT DOCUMENTS

| | | | |
|---|---|---|---|
| 3,369,067 | 2/1968 | De Corso | 219/121 P |
| 3,558,791 | 1/1971 | Gracnev | 219/121 PR |
| 3,615,924 | 10/1971 | Swobodu et al. | 219/121 PR |
| 4,289,949 | 9/1981 | Raaness et al. | 219/121 PR |
| 4,390,773 | 6/1983 | Esser et al. | 219/121 PR |

*Primary Examiner*—M. H. Paschall
*Attorney, Agent, or Firm*—Wolf, Greenfield & Sacks

[57] ABSTRACT

A plasma burner comprises an electrode holder which carries a tubular outer electrode and a coaxially arranged central electrode, and an electrical current supply source, which can be coupled via current feeders to the outer and central electrodes respectively. Also a device is provided for feeding gas into the region of the electrodes, between which an arc is produced for plasma formation. The tubular outer electrode has a first cooled, arc-inactive tube section, consisting of electrically conductive metal, and an adjoining second arc-active uncooled tube section, which consists of heat-resistant and electrically conductive material, and which is releasably connected to the first tube section. The arc passes between the second tube section and the neighboring arc-active section of the coaxial central electrode.

28 Claims, 11 Drawing Figures

PLASMA BURNER WITH REPLACEABLE CONSUMABLE ELECTRODES

The invention relates to a plasma burner comprising; an electrode holder, which carries a tubular outer electrode and a coaxially arranged central electrode; an electrical supply current source for coupling to the outer electrode and the central electrode via current feeders; and an arrangement for feeding gas into the region of the electrodes, between which an arc is produced for plasma formation.

No. EP-B1-00 20 845 discloses such a plasma burner, in which both the tubular outer electrode and the coaxial central electrode are manufactured from graphitic material. The dimensions of both electrodes are such that the clearance between the bar-like inner electrode part and the inner wall of the tubular outer electrode is small relative to their total length. The graphitic electrode material and the electrode dimensions are here so selected that an uninterrupted and uniform speed of axial consumption of the electrodes over their length is achieved. In addition, their shape and operating conditions are maintained. With appropriately long electrodes of the known plasma burner, their free ends can be inserted into a metal melt, the gas pressure being then appropriately high for plasma formation in order that the plasma can pass outwardly in dependence upon the depth of insertion. This means that the gas pressure must be at least equal to the hydrostatic pressure of the respective melt. The plasma burner is so constructed that it functions adequately without cooling medium in the burner.

It is disadvantageous that both the central electrode and also the tubular outer electrode must be adjusted relative to one another by a drive mechanism, since material attrition is caused by the arc in its region between the anode and cathode. Furthermore, it is disadvantageous that, especially with use of graphitic materials and correspondingly long construction of the outer and inner electrodes, particularly at the temperatures achieved during operation as a result of the increase of electrical resistance, a correspondingly high loss of electrical power occurs.

A plasma burner is known from "Voest-Alpine Information" No. 40, in which water-cooled copper tubes are provided with tungsten cathodes. These burners are introduced laterally into furnace. Argon is used as a carrier gas for the plasma burner and thus also as a shield gas for the steel melt of the melting furnace. The said plasma burners are mounted on carriages and are directed with their nozzles towards the melt. The plasma burners are located above the surface of the melt. No provision is made for insertion of the copper anode tube and of the tungsten cathode into the melt. The danger also exists that during insertion cooling water may reach the melt and lead to an explosive generation of steam and damage to the furnace.

The invention is based on the object of providing a plasma burner of the type defined in the introduction, which, on the one hand, provides, at least in the tubular outer electrode, good electrical current conductivity and thus small power loss, and which also, on the other hand, is capable of operation when immersed into the metal melt without difficulty and without need for conversion. Furthermore, the plasma burner is to be constructed simply and for reliable operation, so that continuous advance of the tubular outer electrode and/or of the coaxial central electrode is unnecessary.

This object is achieved according to the invention in that the tubular outer electrode has a first cooled arc-inactive tube section, consisting of electrically conductive metal and an adjoining second uncooled arc-active tube section, consisting of heat-resistant and electrically conductive material, which is releasably coupled to the first section, and in that the arc passes between the second tube section and the neighbouring arc-active section of the coaxial central electrode. This gives the advantage that the region inserted into the metal melt is the second tube section of the tubular outer electrode, which consists of heat-resistant and electrically conductive material. This second tube section is the arc-active section, between which section and the corresponding neighbouring region of the central electrode the arc, which forms the plasma from the supply gas, is generated.

From the fact that the second section is releasably coupled to the adjoining cooled outer section, the advantage results that after corresponding wear (consumption) of this arc-active second tube section, this can be replaced immediately by a new second tube section. Advantageously, the gas serving for plasma formation can be utilized for cooling the arc-inactive region of the plasma burner.

Expediently, the first tube section of the tubular outer electrode is provided on the inner wall, at least in the region neighbouring the second tube section, with an electrically insulating coating. This produces the advantage that the arc is not transferred onto the first tube section.

Expediently, the first tube section of the tubular outer electrode is provided with a protective coating on the outer wall. This provides the advantage of shielding the first tube section externally against heat and external chemical effects.

According to a further construction, the second tube section of the tubular outer electrode consists of graphitic material. This has the advantage that an insensitive second electrode section is created, which not only has good electrical conductivity, but moreover is also heat-resistant. By appropriate addition of further materials, favourable mechanical strength and workability can moreover be achieved.

According to a further embodiment, the second tube section can have a protective sleeve region, which overlappingly surrounds a part of the first tube section. This provides the advantage that the end region of the first tube section adjacent the second tube section is protected, which provides an advantageous shielding effect. This shielding effect operates particularly effectively to shield the cooling system of the first tube section.

For increasing the electrical conductivity of the second tube section of the outer electrode, this can be provided on the interior with an electrically conducting and thermally resistant protective layer.

The second tube section can be provided with an outer tube consisting of boron nitride, which is screwed onto the second tube section.

As already explained in the foregoing, the central electrode consists of graphite. This is preferably impregnated graphite with a maximum particle size up to 4 mm, which includes a fine particle proportion, less than 20%, having a particle size below 1 mm. The central graphite electrode usually possesses a maximum diameter of 350 mm. The graphite quality is advantageously so chosen that the density lies in the range of 1.64 to 1.68 gm/cm$^3$.

In order to achieve good resistance against the steep thermal gradients in the material, which result from localised long-term heating effects of the stable plasma arc, it can be advantageous to select a graphite particle constitution with the smallest possible proportion of fine particles. Within the scope of the invention, a preferred typical particle distribution of the graphite comprises for example approximately 50% of particle sizes in the range of 2 to 4 mm, about 35% of particle sizes in the range of 1 to 2 mm and 15% of particle sizes in the range of 0 to 1 mm.

The carbon material is expediently selected to be needle carbon, having very good laminar longitudinal structuring, which has a plurality of microcracks in the particle structure as a result of the high degree of comminution. In this way, the thermo-elasticity of the entire body is increased even with good and strong binding of the particle components. Mesophase pitches are advantageously used as the binder. These may have approximately the following specification:

Volatile component proportion: 38%
Carbonization number: 64%
Softening point: indefinable
Particle size analysis:
>0.1 mm: 26%
0.1–0.06 mm: 50%
<0.06 mm: 24%

These special pitches are also converted during carbonizing into structurally longitudinally orientated needle carbon, which can be well graphitised and thus show high thermal and electrical conductivity.

The material constitution of the outer annular electrode, i.e. of the second tube section, can expediently have particle sizes up to 8 mm maximum. In this connection, it is particularly preferred to employ a particle size constitution utilizing residues such as employed with ceramic materials requiring high resistance to thermal shock. A typical particle size distribution contains in this connection approximately 60% of particles having a size in the range of 4 to 8 mm, approximately 15% having a size in the range of 1 to 4 mm and approximately 20% having a size in the range of 0 to 1 mm.

The graphitic material for the outer annular electrode and/or for its second tube section is expediently not sealed during manufacture with tar/pitch, so that the pores permit access for the diffusion of metallic vapours and liquids which can react with components of the graphite for increasing the high-temperature oxidation resistance. In this connection, at least the exterior surface binding materials can be formed of graphite and metal carbide, known under the name Zermet materials. These may be formed in particular on the basis of graphite/SiC, graphite/TiC and graphite/BaC.

The production of these materials, which preferably contain 15 to 40% by weight of carbide, can take place by proceeding from a synthetic graphite skeleton, either by impregnation with the metal or by diffusion of the gaseous metals or by gaseous compounds, which at high temperatures convert the graphite to carbides. Such methods are known. Another route leads to these substances by reaction sintering of the carbide in the presence of graphite and auxiliary sintering materials, for example oxidic compounds of yttrium or lanthanum.

The Zermets produced according to the various methods possess a higher specific density than graphite. Each varies according to the particular degree of carbidising from 2.10 to 2.70 gm/cm$^3$, typical values lying in the range of 2.3 to 2.5 gm/cm$^3$. In this connection, within the scope of the invention it is preferred that the said Zermet materials have tensional strengths (kg/cm$^2$) in the range of 300 to 600, pressure resistance (kp/cm$^2$) in the range of 1300 to 5400 and bending resistances (kp/cm$^2$) in the range of 700 to 1200.

Expediently, the second tube section, which is provided with an internal thread, is screwed onto the first tube section.

Particularly advantageously, the central electrode consists, at least in the arc-active end region, of graphitic material, and is connected by means of a nipple or stud and socket connection with the remaining part of the central electrode. This provides the advantage that the arc is guided between the second tube section, which preferably consists of graphitic material, and the arc-active part of the central electrode. In such a configuration, advantages accrue in respect of the material durability and arc guidance, in particular in the condition when the second tube section and the associated central electrode section is inserted into the metal melt.

A further advantage may be seen in that when the arc-active end section of the central electrode is consumed, this section can be replaced in a simple manner.

Advantageously, the remaining central electrode component is provided with an insulating coating. This coating has the advantageous effect that the arc cannot be transferred from the tubular outer electrode onto this insulated central electrode component.

According to a further embodiment, the remaining central electrode component consists of electrically conductive metal and is provided with cooling means. The part of the central electrode not inserted into the metal melt is or becomes cooled whilst the adjoining inserted section of the central electrode is uncooled, since it consists of heat-resistant and electrically conductive material (graphitic material).

According to another advantageous embodiment, the remaining central electrode component consists of graphitic electrode components which are each connected together by nipple or stud and socket connections. In this case, the outer layer of the central electrode is expediently provided with an electrically conductive coating and if necessary an electrically insulating layer thereon. This has the advantage that the current flow takes place not only through the central electrode itself but also through the electrically conductive coating layer. The final electrically insulating layer has the already-mentioned advantage of arc inactivity.

According to a further embodiment, the central electrode is connected as anode to the positive pole, and the tubular outer electrode is connected as cathode to the negative pole of a d.c. current supply source. Of course, instead of a d.c. source, also an alternating current source, or a pulsating d.c. current source can be employed.

The use of the tubular outer electrode as cathode and of the central electrode as anode has the advantage that the electrons serving as main charge carriers flow from the second tubular section of the outer electrode to the associated section of the central electrode so that the actual consumption of material occurs on the second tubular electrode section. The ion current (positive charge carrier) flowing in the reverse direction is comparatively small, as compared with the electron current.

According to a further embodiment, cooling of the first tube section of the outer electrode and possibly also of the central electrode or parts thereof is achieved by a cooling system, employing liquid or heat pipes.

The cooling system includes a cooling medium source, which is regulated in respect of the temperature of the cooling medium and/or in respect of the through flow by means of a cooling medium regulating stage. The cooling medium regulating stage is coupled to a thermo-electric converter, which is provided in the respective cooled end region of the tubular outer electrode and possibly also of the central electrode.

According to a further advantageous embodiment, the central electrode comprises a channel for an additional medium, in particular for a reducing and/or inert and/or lightly oxidising gas, which escapes through at least one outlet opening via the intermediate space delimited by the second tube section of the outer electrode and the central electrode section.

The plasma burner according to the invention is advantageously applicable for use in a Kupol furnace for smelting of metal, which comprises an upper coating chamber, a lower smelting chamber and a cooled grid therebetween. Kupol furnaces are driven with or without coke. In the case of coke Kupol furnaces, coke serves as fuel, whilst in cokeless Kupol furnaces oil or gas is used as fuel. The combustion takes place in coke Kupol furnaces using air in front of the nozzles, whilst in cokeless Kupol furnaces the air is supplied into the burners. The plasma burner according to the invention is particularly suitable for cokeless Kupol furnaces. The cokeless Kupol furnaces comprise water-cooled grid bars in the plane of the burners, balls of ceramic material being provided on the water-cooled grid for heating the falling iron whilst providing an increase of the contact surface. The zone of highest temperature and greatest oxidation is in this connection in the burners beneath the installation. Particulate carbonizing means is provided for carbonizing in cokeless Kupol furnaces, more specifically by injection beneath the water-cooled grid.

In conventional cokeless Kupol furnaces, the melt is transferred after the melting process into a special bath, in which the temperature of the melt is brought to the appropriate level with the aid of an inductor. Advantageously, the plasma burner according to the invention, which extends laterally into the melting chamber of the cokeless Kupol furnace, is adjustable, at least along its axis, in such manner that, at least in the initial stage of the charge melting phase, it adopts a first position with the plasma lance located outside the melt, and in the next phase a second position in which a second section of the tubular outer electrode and the associated central electrode component are immersed at least partially into the melt.

In this connection, the plasma burner is coupled to a control and regulating device for movement control of the plasma burner and for control and regulation of the voltage supply, the media flow and/or the cooling. This provides the advantage that the metal melt can remain in the melting chamber after the end of the melt down process, since with the aid of the control and regulating device, the plasma burner is inserted into the melt and its temperature is correspondingly regulated, in which connection additional further means, particularly gaseous, can be added. Accordingly, the plasma burner is employed both for the melting down phase, and also for the following phase, in one and the same melt receiving chamber.

In the following the invention will be described with reference to the exemplary embodiments illustrated in the Figures, in which.

Figure 1:
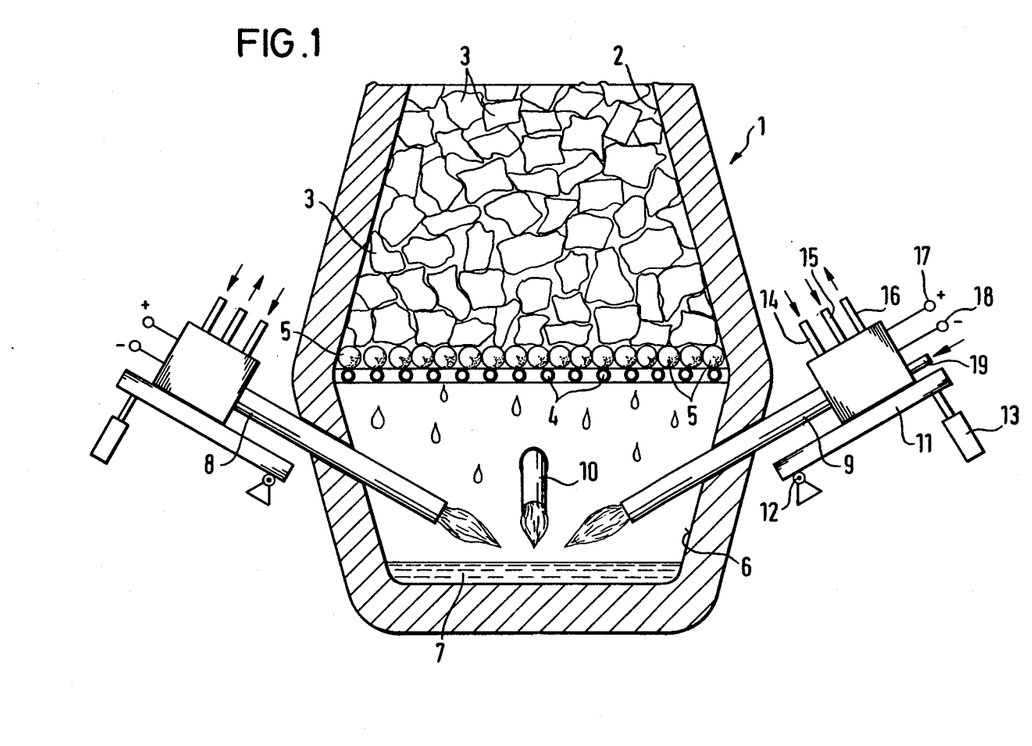
FIG. 1 illustrates a schematic view of part of a cokeless Kupol furnace in conjunction with plasma burners in the melting down phase.

FIG. 1 illustrates a cokeless Kupol furnace, which comprises a tubular charge chamber 2 for a charge 3 of iron ore. Reference numeral 4 designates a water-cooled grid, supporting ceramic balls 5. Reference numeral 6 designates a burner and smelting chamber, into which the iron melt drops and collects as a melt bath 7. Reference numerals 8, 9 and 10 designate similar plasma burners, which extend on a slant from the exterior laterally inwards into the smelt chamber 6. Each plasma burner is slidably displaceable on a carriage 11, in the axial direction of the plasma burner. The carriage is pivotable about a pivot axis 12 with the aid of a hydraulic drive 13. Reference numeral 14 designates a feed line for a plasma-forming gas. Reference numerals 15 and 16 designate tube connections for cooling water. Connections 17 and 18 lead to the positive and negative poles of a d.c. current source which is not illustrated. Reference numeral 19 designates a tube connector for an additive medium. According to FIG. 1, the plasma burners are located with their lance-like flame points (plasma lances) above the melt bath 7.

Figure 2:
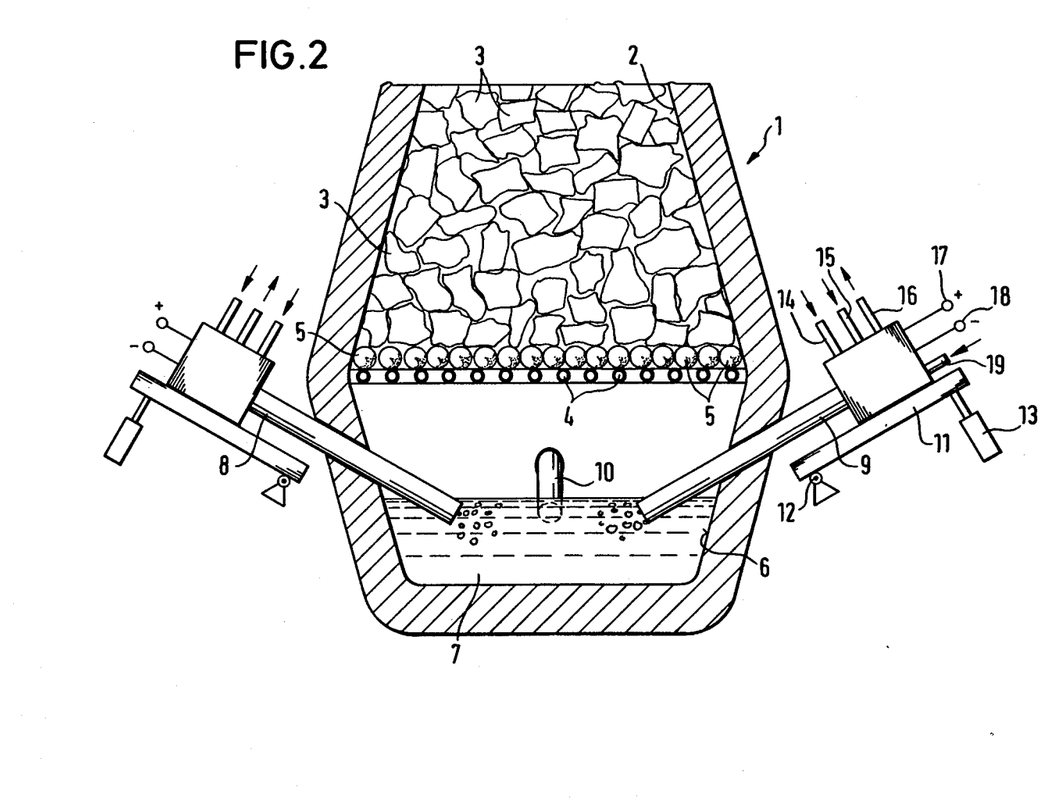
FIG. 2 shows the cokeless Kupol furnace with plasma burners inserted into the melt.

In FIG. 2, the components corresponding to those according to FIG. 1 are provided with the same reference numerals. In contrast to FIG. 1, in the representation of FIG. 2, the smelting process has ended, and the respective tips or end regions of the plasma burners 8, 9 and 10 are dipped into the iron melt bath. In a manner which is not illustrated, the melt bath is held at a predetermined temperature or, as the case may be, brought to a predetermined temperature. Furthermore, by the introduction of the additive medium through the connector 19, a supplementary treatment process is carried out. The pressure of the plasma-forming gas, which is supplied by the connection 14, is so large that it overcomes the hydrostatic pressure of the melt.

Figure 3:
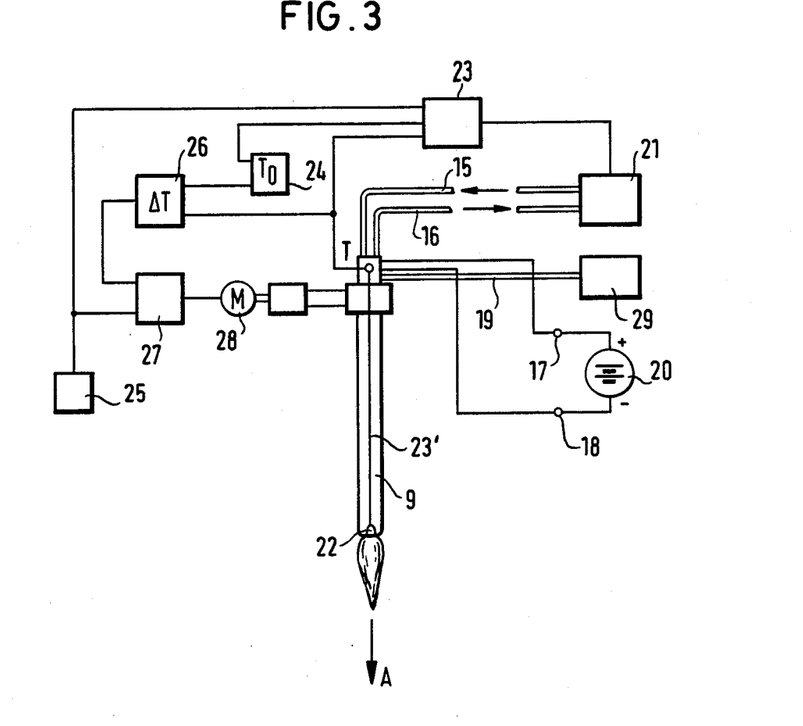
FIG. 3 schematically illustrates a control and regulating circuit for a plasma burner.

In FIG. 3, the components which correspond to those of FIGS. 1 and 2 are provided with the same reference numerals.

The conductor leading to the positive connection terminal of a d.c. current source 20 leads according to FIG. 3 to the bar-like central electrode of the plasma burner 8, 9 or 10, which is not illustrated. The conductor leading to the negative terminal of the d.c. current source 20 leads in a manner which is not illustrated to the tubular section of the outer electrode of the plasma burner 8, 9 or 10, as the case may be.

The supply conduit 15 and the discharge conduit 16 for the cooling liquid are coupled to a cooling liquid source 21. An electrical connection 23' leads from a thermo-element 22 provided in the tip or end region of the plasma burner 9, and is connected to a cooling liquid regulator stage 23, which comprises a further input control connection to a temperature comparator stage 24, and comprises a third control connection to a melt level measuring stage 25. A further connection leads from the temperature comparator stage 24 to a temperature difference stage 26, which is connected via the control connection 23 to the above-mentioned thermo-element.

Reference numeral 27 designates a motor control stage, which is connected on the one hand to the temperature difference stage 26, and on the other hand to the melt level measuring stage 25. To the output is connected a motor 28, by means of which the plasma burner is movable in the direction of arrow A, or in the opposite direction. With the aid of the cooling liquid regulator stage 23, an output signal is produced in dependence upon the temperature measured by the thermo-electric convertor 22, and in dependence upon the comparison temperature set in the stage 24, and in dependence upon the signal from the melt level measuring stage 25 when the plasma burner is dipped in the melt, which output signal regulates both the temperature and also the through-flow of the cooling liquid in the device 21. A control signal for the motor control circuit 27 is produced in the temperature difference stage 26 in order suitably to regulate the cooling, in the event of temperature increases in the region of the arc-active components of the plasma burner. Reference numeral 29 designates a control device for the supply of an additive medium through the conduit 19.

Figure 4:
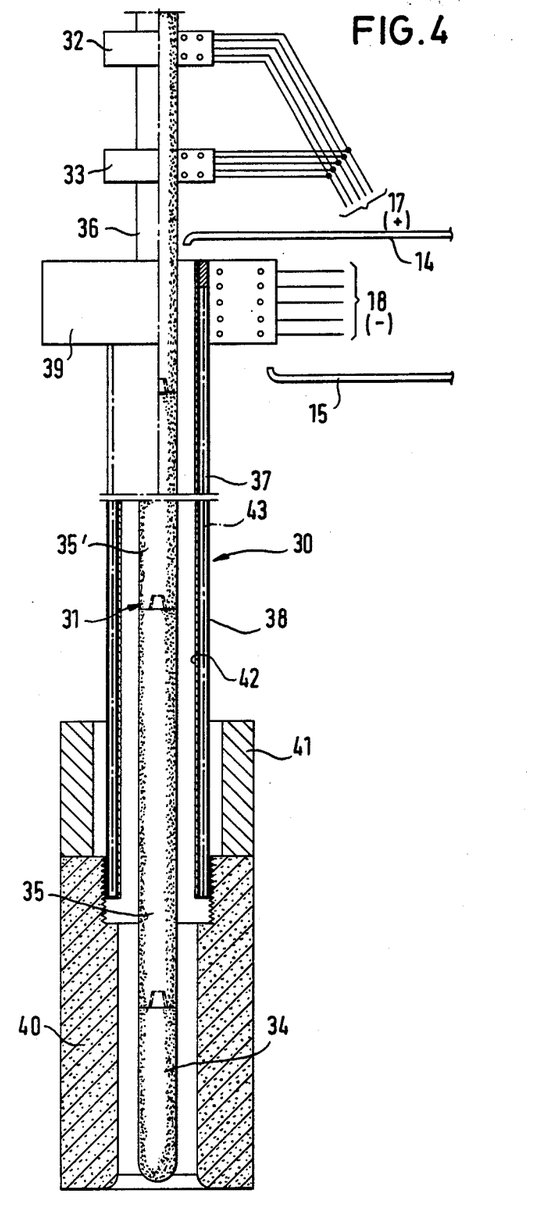
FIG. 4 is a schematic sectional view of a plasma burner.

In FIG. 4, the components corresponding to those in FIGS. 1 to 3 are provided with the same reference numerals. Each plasma burner 8, 9 or 10 consists of a tubular outer electrode 30 and of a bar-like central electrode 31. The bar-like central electrode 31 consists of graphitic material and is connected via current connection points 32 and 33 and corresponding current supply cable to the connection position 17, which is connected to the positive pole of the d.c. current source 20, illustrated in FIG. 3. The bar-like central electrode consists of bar segments 34, 35, 35' and 36, which are connected together by means of respective plug and socket connections.

The tubular outer electrode 30 is cooled and consists of a first tubular section of electrically conductive metal. This tubular metal outer electrode section, provided with annular chambers, is in turn sub-divided into a first section 37 of copper and an adjoining tubular section 38 of steel. Reference numeral 39 designates a current feed which passes via connection cable to the connection point 18, which in turn is connected to the negative pole of the d.c. current source 20.

Reference numeral 40 designates a tubular member consisting of graphitic material, which is provided with an internal thread and is screwed onto an outer thread on the end of the first tubular section 38. Reference numeral 41 designates a tubular shield and protection section, which is connected to the tubular part 40 and overlaps the end region of the first tube section.

The shield tube section 41 preferably consists of thermally resistant and conductive material, and is electrically insulating.

A cooling system is provided in annular chambers, in a manner which is not illustrated, in the first tube sections 37 and 38 of the outer electrode in order suitably to cool this metal tube section, and in order moreover to provide good electrical conductivity.

The inner surface of the first tube section of the outer electrode is provided with an electrically insulating layer in order to make this first tube section arc-inactive. This insulating layer is designated with reference numeral 42.

The bar-like inner electrode of graphitic material can be so improved electrically, e.g. by appropriate additives, that satisfactory current flow with small losses is ensured. Moreover, the possibility exists of providing the bar-like inner electrode or central electrode with a conductive coating, which in turn can be provided in the arc-inactive region with an insulating layer.

The arc-active part of the central electrode is the part designated with reference numeral 34, whilst the arc-active part of the tubular outer electrode is the part or section designated with reference numeral 40. When a sufficiently high voltage is applied to the plasma burner, and after an electrical connection between the anode and the cathode is effected for a short time in a manner which is not illustrated, an arc is generated between the section 34 of the central electrode and the section 40 of the outer electrode, by which arc the gas supplied through the inlet 14 is converted into a plasma. After the formation of the arc, electrons flow from the cathode tube section 40 to the central section 34 of the anode and positive ions flow from the anode section 34 to the cathode section 40. The electron flow is generally very much greater than the ion flow. The charge carrier flow is surrounded by a magnetic field, which gives rise to a gradient in the magnetic field when the arc is bent. Since the arc is bent outwardly, a force component, determined by the Lorentz force, occurs in the direction of the tip of the plasma burner, with the resulting effect that the arc forms in the end region of the plasma burner.

Because of the fact that the tube section of the outer electrode performs as a cathode and the associated section 34 of the central electrode performs as an anode, the advantage results that the central section 34 is less strongly consumed than the tubular outer section 40.

The presence of the protective tube section 41, which is a good thermal conductor and overlaps the first tube section 38 of the outer electrode, brings the advantage that the overlapped region of the first tube section of the outer electrode is, in particular, thermally protected, particularly having regard to the cooling system located therein. In FIG. 4, the cooling system is indicated by the reference numeral 43.

Figure 5:
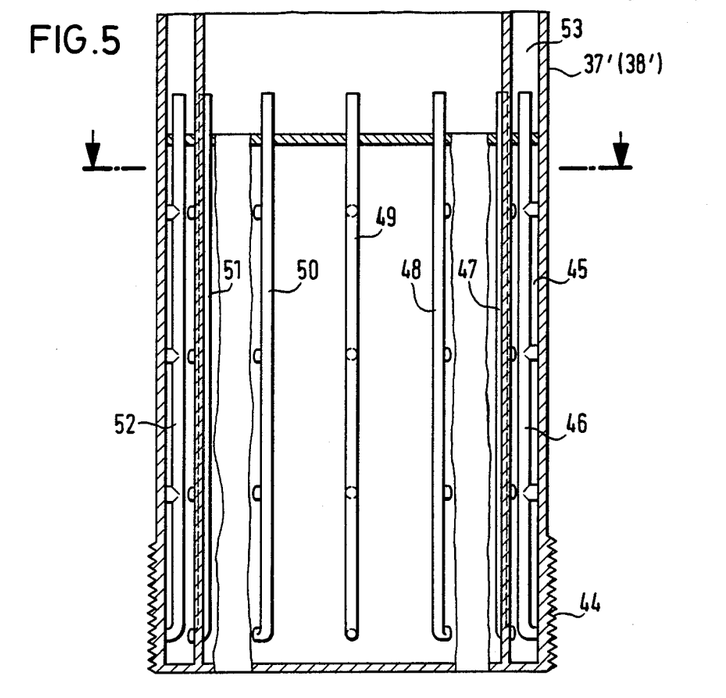
FIG. 5 shows a section of the end region of the cooled first tube section of the outer electrode.
Figure 6:
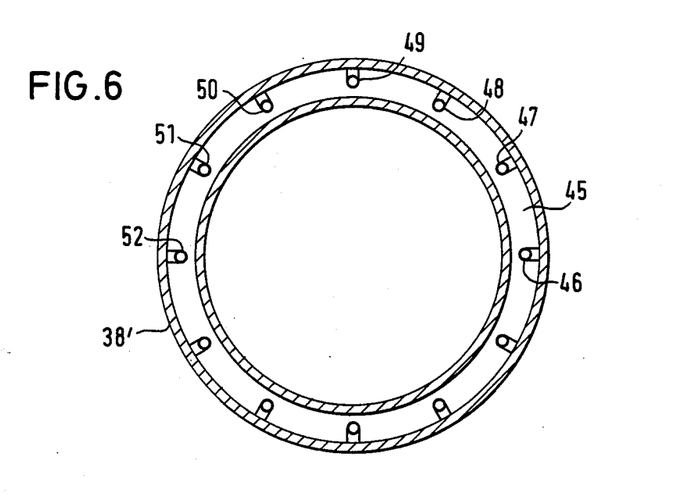
FIG. 6 shows a sectional view through this tube section.

In FIGS. 5 and 6, a first exemplary embodiment of such a cooling system within the first tube section of the outer electrode is illustrated. In FIGS. 5 and 6, parts corresponding to those in FIG. 4 are provided with the same reference numerals. For distinguishing purposes, these reference numerals carry indicese. The end section of the first tube section 38' of the outer electrode provided with outer thread 44 has a closed annular chamber region 45 in which so-called heat pipes 46, 47, 48, 49, 50, 51 and 52 are arranged, which effect heat exchange with the adjoining annular chamber 53. These heat pipes have a predetermined length, the separation between the two neighbouring annular chambers 45 and 53 preferably lying in the connection region of the current feeders, or, as the case may be, at least outside the receiving chamber for the melt.

As may be seen from FIG. 5, each heat pipe has a plurality of contact surfaces with the inner wall of the first tube section of the outer electrode. In this manner, heat extraction takes place at a plurality of locations of the first tube section of the outer electrode. These extraction locations are preferably uniformly distributed both in the peripheral direction and also in the longitudinal direction of the first tube section.

Figure 7:
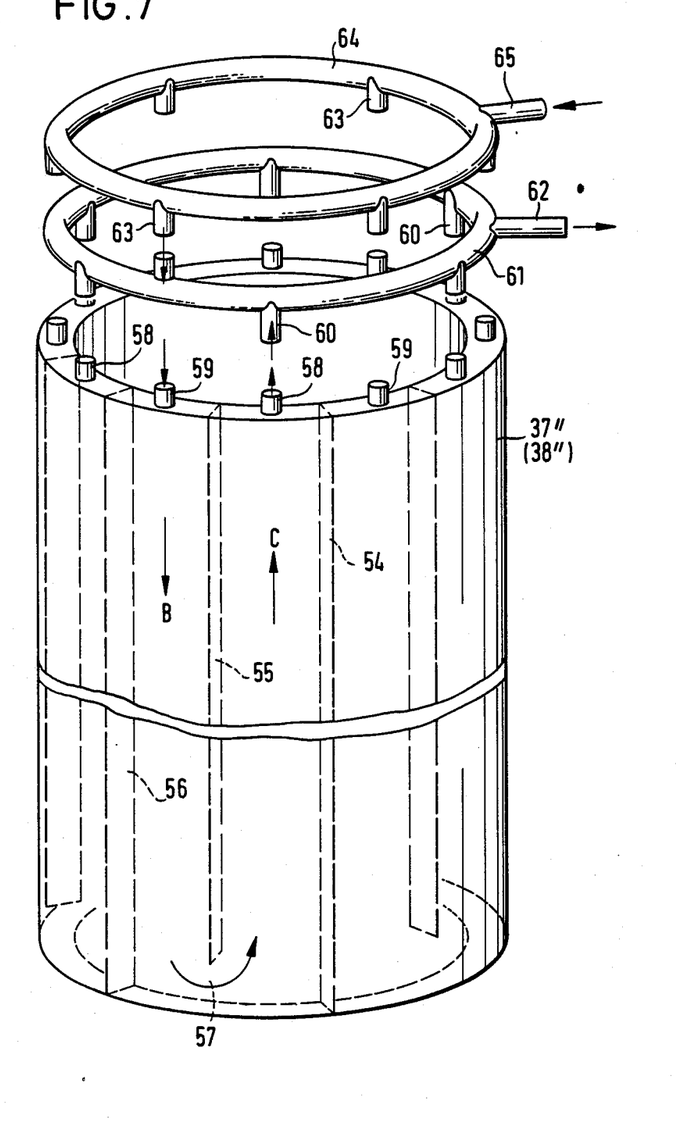
FIG. 7 shows a water-cooled end section of the first outer electrode section.
Figure 8:
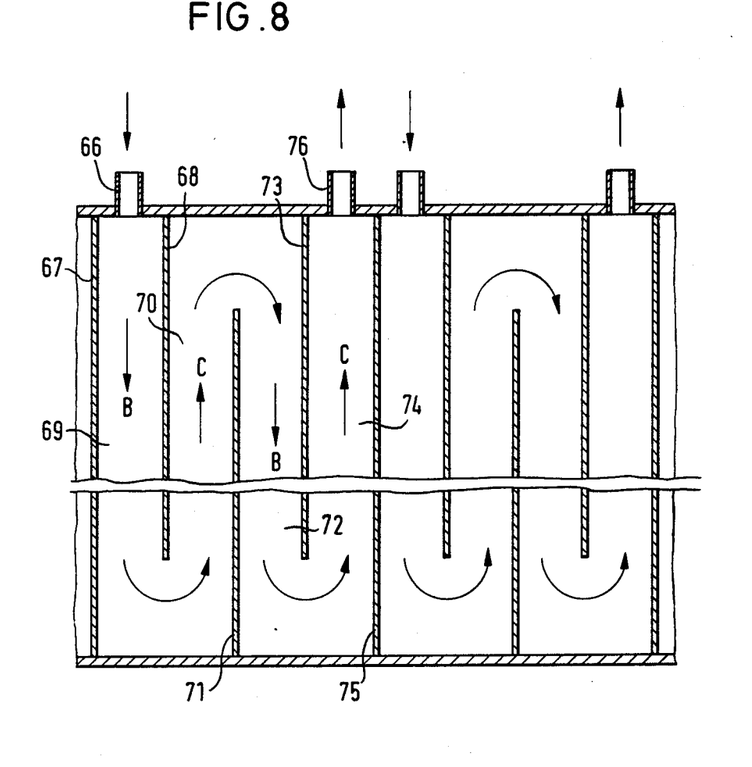
FIG. 8 shows a developed view of the first section of the outer electrode.

FIG. 7 illustrates a further possibility for a cooling system in the first tube section of the outer electrode. Here the parts corresponding to those of FIG. 4 or 5 or 6, as the case may be, are provided with the same reference numerals. For purposes of distinction, these identical references have indices. The first tube section 37" and 38" is constructed as a double tube section, referred to as an annular chamber. This annular chamber 37" and/or 38" is provided with longitudinally-extending partition walls 54, 55, and 56, the partition wall 55 having an apertured region 57, so that two mutually communicating sub-chambers are formed by the partition walls 54, 55 and 56. This arrangement of the partition walls is repeated along the entire periphery. The chamber defined by the neighbouring partition walls 54 and 55 has a connector 58, whilst the chamber formed by the partition walls 55 and 56 has a connector 59. Connector 58 is in communication with a corresponding connector 60 in an annular conduit 61, which is in communication via an outlet connector 62 with a device corresponding to the device 21 (FIG. 3). A corresponding arrangement is provided also for the further outlet connectors, which are not illustrated, on the side of the first tube section and on the side of the annular conduit. The inlet connector 59 corresponds with a similar connector 63 of a further annular conduit 64, which is in communication via a connector 65 with the inlet conduit, which leads to the cooling liquid system. The cooling liquid flow is such that the cooling liquid in each case flows through the inlet connector 59 in the annular chamber in direction B, enters the neighbouring chamber through the passage 57 and escapes again in the direction C through the outlet connector 58. The same is repeated in the neighbouring chamber pairs. In this manner, uniform cooling is ensured, considered in the peripheral direction. According to FIG. 8, also a number of neighbouring chambers of the annular chamber, e.g. four, can be associated together for flow purposes. Thus, through an inlet 66, cooling liquid enters (direction B) the chamber 69, formed by the partition walls 67 and 68, and is then deflected (direction C) into the neighbouring chamber 70. This neighbouring chamber is formed by the partition walls 68 and 71. Thereafter, the cooling liquid flow is deflected out of the direction C into the direction B into the neighbouring chamber 72, which is formed by the partition walls 71 and 73. After subsequent deflection of the cooling liquid flow into the chamber 74, which is formed by the partition walls 73 and 75, the cooling liquid leaves the annular chamber via the outlet connector 76. In the neighbouring chambers, corresponding deflection of the cooling liquid flow takes place. Also in this exemplary embodiment, each inlet opening or inlet connector and each outlet connector is connected to a respective annular conduit.

Figure 9:
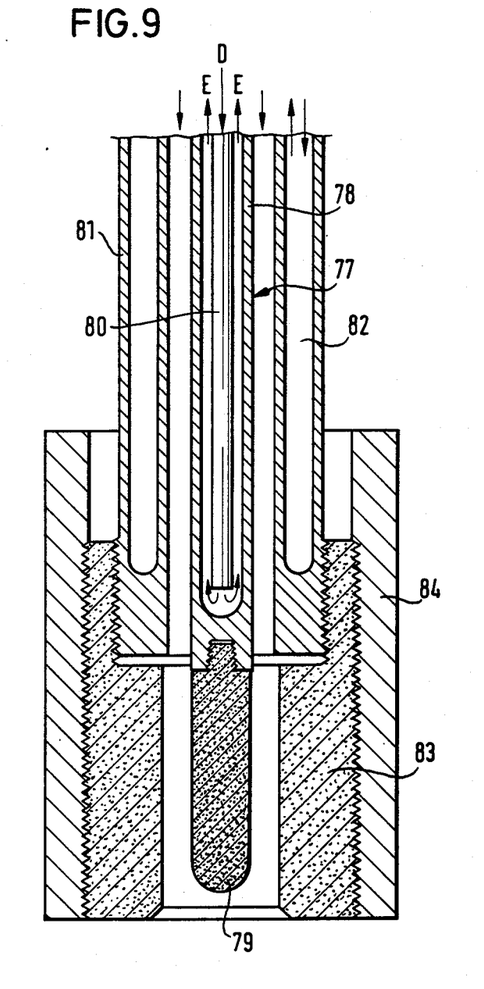
FIG. 9 shows a section through the end region of the plasma burner with a cooled first section of the tubular outer electrode and of the central electrode.

In FIG. 9, a bar-like central electrode 77 is constructed from two sections. The first section consists of a metallic cooled arc-inactive section in the form of a hollow tube or annular chamber tube 78, and of an arc-active bar section 79, consisting of graphitic material, which is connected by means of a plug and socket connection to the first central section 78, consisting of metal. This metallic central electrode tube section 78 has an inner tube 80, which is guided downwardly into the hollow chamber to the vicinity of the end region. Cooling liquid is introduced in the direction D through this central tube. The cooling liquid escapes again from the annular chamber in the direction E. In a manner which is not illustrated, the outer surface of the metallic bar tube section of the central electrode is provided with an insulating thermally resistant coating, in order to make this region inactive for the arc.

The first tube section of the outer electrode, which is designated with reference numeral 81, is likewise constructed of metal. It has an annular chamber region 82, which serves as a cooling chamber for the cooling liquid.

Onto the terminal outer thread of this outer electrode section is screwed a second tube section 83, which consists of graphitic material and serves as an active part of the cathode for arc formation. This graphite tube cathode part 83 is provided with an outer thread, onto which a further tubular part 84 is screwed, which consists of electrically insulating material, which is a good thermal conductor and which moreover has good mechanical workability. In particular, this tubular protector and shield component may consist of boron nitride. It overlaps the end region of the metallic first tubular section of the outer electrode. In this manner, it produces a good shielding effect. In the example illustrated in FIG. 9, an intermediate chamber is provided between the rear part of the shield tube 84 and the metallic end region of the first section 81 of the outer electrode. According to a further possibility, this overlapping region of the shield tube can also be led up to the outer sleeve of the metallic tubular section, in order to provide contact leading to improved heat transfer and outflow.

Figure 10:
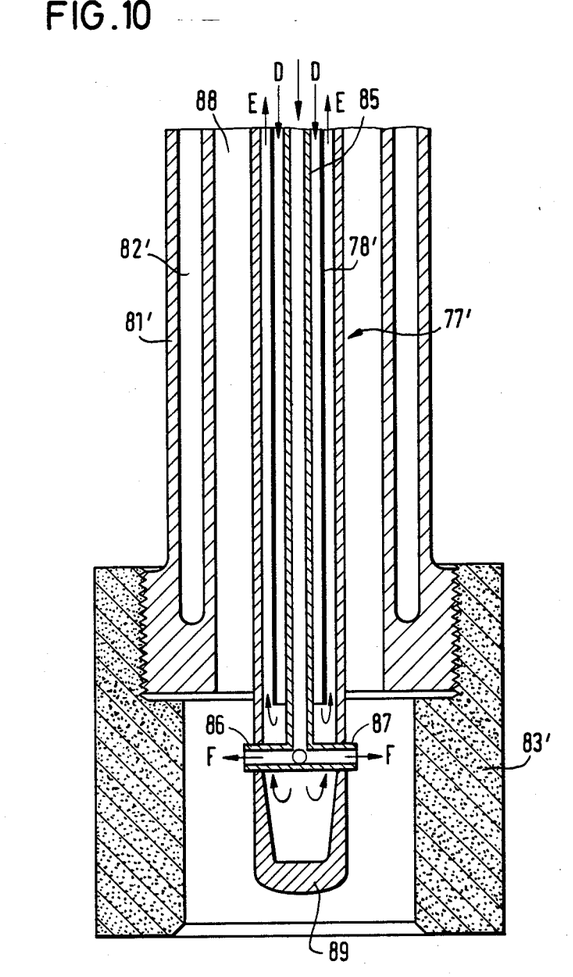
FIG. 10 shows a sectional view of the end region of the plasma burner with the cooled central electrode and a feed channel for an additive medium.

In FIG. 10, the parts corresponding to those in FIG. 9 are provided with the same reference numerals. In order to distinguish them, however, they are provided with indices. In contrast with the exemplary embodiment of FIG. 9, the bar-like central electrode 77' has an inner tube 85, which extends as a channel to the end region of the central electrode and passes outwardly via tube sections 86 and 87 and in this manner opens the possibility of transferring an additive medium, such as a gaseous additive, along the central axis and allowing it to escape (in the direction of arrow F) in the end region of this bar-like electrode. This additive may serve for special treatment of the melt.

Via the hollow tube 78', cooling liquid is brought into the central electrode, in order to cool this up to the tip region. The gas serving for plasma generation is introduced through the annular chamber region 88. The arc-active part of the central electrode is provided with an insulating coating. The same applies to the arc-inactive part of the first tubular section of the outer electrode.

Figure 11:
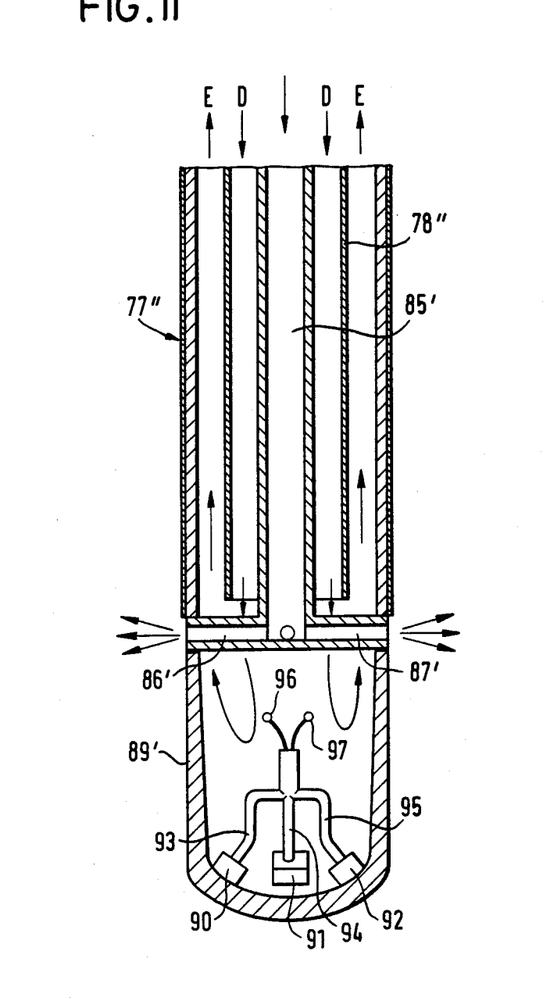
FIG. 11 shows a sectional view of the end region of a cooled central electrode with a temperature sensor.

In the exemplary embodiment according to FIG. 11, the parts corresponding to those of FIG. 10 are provided with the same reference numerals. In order to distinguish them, however, they are provided with indices. This Figure is an enlarged view of the central metallic electrode which, in the tip region of the arc-active part, is provided with thermo-electric converter elements. These are designated with reference numerals 90, 91 and 92. Insulation lines are indicated with reference numerals 93, 94 and 95. Two common connection lines for the thermo-elements 90, 91 and 92 are indicated with reference numerals 96 and 97. These two connection lines correspond to the sensor line 23 of FIG. 3.

Such thermo-electric converter elements may also be applied in the end region of the respective metal tube section of the central electrode with the embodiments of FIGS. 9 and 10. The same applies, of course, to the corresponding cooled region of the outer electrode.

What is claimed is:

1. A plasma burner having a tubular outer electrode, a central electrode located coaxially within said outer electrode thereby forming an annular space between said electrodes, an electrical current supply, means for coupling the current supply to the outer electrode and to the central electrode and means for feeding gas into the annular space, whereby an arc for plasma formation is produced between the electrodes,
characterized in that the tubular outer electrodes is comprised of a first cooled, arc-inactive electrically-conductive tube section and a second uncooled arc-active consumable tube section which second tube section is releasably coupled to the first tube section and
further characterized in that the central electrode is comprised of a third arc-inactive electrically-conductive section and a fourth arc-active consumable section which third electrode section is releasably coupled to the fourth electrode section.

2. A plasma burner according to claim 1, wherein the first tube section of said outer electrode is provided with an electrically insulating layer on its inner wall at least in the region neighbouring the second tube section.

3. A plasma burner according to claim 1, wherein the first tube section of the tubular outer electrode is provided with a protective layer on the outer wall.

4. A plasma burner according to claim 1, wherein the second tube section of the tubular outer electrode consists of graphic material.

5. A plasma burner according to claim 4, wherein the second tube section is provided with a protective sleeve region, which overlaps a part of the first tube section.

6. A plasma burner according to claim 4, wherein the second tube section of the outer electrode is provided with an electrically conductive and thermally resistant protective layer on its interior.

7. A plasma burner according to claim 4, wherein the second tube section is provided with an outer tube consisting of boron nitride, which is threadingly engaged with the second tube section.

8. A plasma burner according to claim 1, wherein the second tube section is provided with an internal thread and is threadingly engaged with the first tube section.

9. A plasma burner according to claim 1 wherein at least the arc-active fourth section of the central electrode consists of graphitic material, and is connected by means of a stud and socket connection to the third electrode section.

10. A plasma burner according to claim 9, wherein the third electrode part is provided with an insulating coating.

11. A plasma burner according to claim 9, wherein the third electrode part consists of electrically conductive metal and is provided with cooling means.

12. A plasma burner according to claim 9, wherein the third electrode part consists of electrode components coupled together with stud and socket connections.

13. A plasma burner according to claim 1, wherein the entire central electrode consists of electrically conductive metal and is provided with cooling means.

14. A plasma burner according to claim 1, wherein the central electrode is connected as anode to the positive pole, and the tubular outer electrode is connected as cathode to the negative pole of a d.c. current supply source.

15. A plasma burner according to claim 1, wherein the first tube section of the outer electrode, and, at least part of the central electrode, comprises a cooling system employing liquid or heat pipes.

16. A plasma burner according to claim 15, wherein the cooling system has a cooling medium source and a cooling medium regulating stage for regulating at least one of the temperature of the cooling medium and the through-flow.

17. A plasma burner according to claim 16, wherein the cooling medium regulating stage is connected to a thermo-electric converter, which is provided in the respective cooled annular chamber region of the tubular outer electrode, and optionally in that of the central electrode, in order to control the cooling medium flow.

18. A plasma burner according to claim 1, wherein the central electrode is provided with a longitudinal channel for a gaseous additive which can escape through at least one outlet opening via the intermediate chamber delimited by the second section of the outer electrode and the associated central electrode section.

19. A plasma burner according to claim 1, wherein the central electrode is formed of impregnated graphite, having a maximum particle size up to 4 mm, which has a less than 20% particle proportion having a particle size less than 1 mm.

20. A plasma burner according to claim 19, wherein the central electrode has been manufactured by graphitising from needle carbon, having a lamellar longitudinal structure, employing mesophase pitch.

21. A plasma burner according to claim 4, wherein the second tube section is formed of unsealed graphite, having particle sizes up to 8 mm maximum.

22. A plasma burner according to claim 21, wherein the second tube section is formed of graphite with particulate structure, which contains more than 50% of particles in the range of 4 to 8 mm.

23. A plasma burner according to claim 22, wherein the graphite has been reacted at least on its outer surface with metallic vapor and/or liquids, or by reaction sintering with carbides, in order to produce compound materials of graphite and metal carbide.

24. A plasma burner according to claim 23, wherein the compound material is a Zermet material, which is selected from the group consisting of graphite/SiC, graphite/TiC and graphite/BaC.

25. A plasma burner according to claim 24, wherein the specific density of the Zermet lies in the range of 2.10 to 2.70 gm/cm$^3$.

26. A furnace comprising;

a charge chamber;
a grid means beneath said charge chamber;
a smelting chamber beneath said grid means; and
at least one plasma burner extending into said smelting chamber,
said at least one plasma burner comprising: an electrode holder, which carries a tubular outer electrode and a coaxially arranged central electrode, an electrical current source, means for coupling the tubular outer electrode and the central electrode to the electrical current source, the tubular outer electrode having a first cooled, arc-inactive tube section consisting of an electrically conductive metal and an adjoining second uncooled, arc-active tube section consisting of a heat-resistant and electrically conductive, consumable material which second section is releasably coupled to the first tube section, and the central electrode having a third arc-active, consumable section located in the vicinity of said arc-active section of said outer electrode; and an arrangement for feeding gas into the region of the electrodes, whereby an arc for plasma formation can be produced between said second tube section and said arc-active section of the coaxial central electrode.

27. A kupol furnace for metal smelting comprising,
an upper charge chamber,
a lower burner chamber located below said upper charge chamber for receiving a metal melt from said upper chamber,
a cooled grid located between said upper charge chamber and said lower burner chamber,
a plasma burner extending laterally into said melt chamber said plasma burner comprising,
   a tubular outer electrode comprised of a first cooled, arc-inactive, electrically-conductive tube section and a second uncooled, arc-active tube consumable tube section releasably coupled to said first tube section, and
   a central electrode located coaxially inside said outer electrode, said central electrode having a third cooled, arc-inactive, electrically conductive section and a fourth uncooled, arc-active, consumable section releasably coupled to said third tube section, an electrical current source,
means for connecting said current source to said first and third electrodes,
means for feeding gas into the annular region between said electrodes to generate a plasma lance extending from said electrodes, and
means for moving said plasma burner in a direction parallel to its axis so that during an initial phase of smelting the charge in said upper chamber, the plasma burner is located at a first position where said plasma lance is located outside said metal melt and during a subsequent phase of smelting the plasma burner is located at a second position in which said second and fourth electrodes are inserted at least partially into said metal melt.

28. A kupol furnace according to claim 27 further comprising a control and regulating device coupled to the plasma burner for movement control of the plasma burner and a second control and regulating device for control and regulation of the current supply and of the media flow through the cooling means.

* * * * *